US009188985B1

(12) United States Patent
Hobbs et al.

(10) Patent No.: US 9,188,985 B1
(45) Date of Patent: Nov. 17, 2015

(54) SUGGESTING A ROUTE BASED ON DESIRED AMOUNT OF DRIVER INTERACTION

(71) Applicant: Google Inc., Mountain View, CA (US)

(72) Inventors: Nicholas Kenneth Hobbs, San Francisco, CA (US); Lawrence Burns, Franklin, MI (US); Brian Cullinane, San Jose, CA (US)

(73) Assignee: Google Inc., Mountain View, CA (US)

( * ) Notice: Subject to any disclaimer, the term of this patent is extended or adjusted under 35 U.S.C. 154(b) by 96 days.

(21) Appl. No.: 13/629,799

(22) Filed: Sep. 28, 2012

(51) Int. Cl.
*G01C 22/00* (2006.01)
*G05D 1/02* (2006.01)

(52) U.S. Cl.
CPC ............ G05D 1/0255 (2013.01); G05D 1/0272 (2013.01)

(58) Field of Classification Search
CPC . G05D 1/0278; G05D 1/0274; G05D 1/0246; G05D 1/024
USPC ...................... 701/2, 23–25, 36, 400; 342/455
See application file for complete search history.

(56) References Cited

U.S. PATENT DOCUMENTS

| | | | | |
|---|---|---|---|---|
| 5,689,252 A | * | 11/1997 | Ayanoglu et al. | 340/991 |
| 5,774,069 A | * | 6/1998 | Tanaka et al. | 340/903 |
| 6,014,081 A | * | 1/2000 | Kojima et al. | 340/576 |
| 6,591,172 B2 | * | 7/2003 | Oda et al. | 701/23 |
| 7,598,889 B2 | * | 10/2009 | Maeda et al. | 340/995.27 |
| 7,982,620 B2 | * | 7/2011 | Prokhorov et al. | 340/576 |
| 8,509,982 B2 | * | 8/2013 | Montemerlo et al. | 701/26 |
| 2003/0158651 A1 | * | 8/2003 | Matsuo et al. | 701/200 |
| 2010/0292916 A1 | * | 11/2010 | Kurciska et al. | 701/201 |

OTHER PUBLICATIONS

H. Krishnan, The Connected Vehicle and Continuous Safety, GM R&D Center, WiVEC Panel @ Baltimore, Oct. 1, 2007, 23 pages.
Michael Chapman, Connected Vehicles and Weather—The Vehicle Data Translator (VDT) Version 3.0, National Center for Atmospheric Research (NCAR) Research Applications Lab (RAL), Boulder, CO, U.S. Department of Transportation, Federal Highway Administration, Sep. 19, 2011, 23 pages.

* cited by examiner

*Primary Examiner* — Tuan C. To
*Assistant Examiner* — Shardul Patel
(74) *Attorney, Agent, or Firm* — Lerner, David, Littenberg, Krumholz & Mentlik, LLP

(57) ABSTRACT

Aspects of the disclosure relate generally to generating and providing route options for an autonomous vehicle. For example, a user may identify a destination, and in response the vehicle's computer may provide routing options to the user. The routing options may be based on typical navigating considerations such as the total travel time, travel distance, fuel economy, etc. Each routing option may include not only an estimated total time, but also information regarding whether and which portions of the route may be maneuvered under the control of the vehicle alone (fully autonomous), a combination of the vehicle and the driver (semiautonomous), or the driver alone. The time of the longest stretch of driving associated with the autonomous mode as well as map information indicating portions of the routes associated with the type of maneuvering control may also be provided.

31 Claims, 12 Drawing Sheets

FIGURE 1     100

SUGGESTING A ROUTE BASED ON DESIRED AMOUNT OF DRIVER INTERACTION

BACKGROUND

Autonomous vehicles use various computing systems to aid in the transport of passengers from one location to another. Some autonomous vehicles may require an initial input or continuous input from an operator, such as a pilot, driver, or passenger. Other autonomous systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Often an autonomous vehicle cannot or should not drive an entire route in fully autonomous mode due to road conditions or other environmental factors. Thus, some routes may require some amount driver control or interaction at some point during the trip. Generally, the driver is not informed of the need to take control of the vehicle until immediately before such a change is necessary.

BRIEF SUMMARY

One aspect of the disclosure provides a method. The method includes receiving input including a destination; generating a set of proposed routes between a current location of a vehicle and the destination based on detailed map information; for each route of the set of proposed routes, generating by a processor, corresponding control information, the control information defining which portions of a particular route may be maneuvered in a manual driving mode where a driver controls one or more of the steering, acceleration, and braking, and where the control information also defines which portions of the particular route may be maneuvered in an autonomous mode where the processor controls the steering, braking, and acceleration; providing a set of routing options, wherein each routing option includes a particular proposed route of the set of proposed routes and the corresponding control information for the proposed route; receiving input indicating one of the proposed routes of the set of proposed routes; and after receiving the input indicating the one proposed route, maneuvering the vehicle according to the corresponding control information for the indicated proposed routes.

In one example, generating the corresponding control information for each route of the set of proposed routes includes: inputting control factors into a probabilistic estimation of failure for a plurality of different types of failures along the given route to generate a set of probabilistic estimations, wherein the different types of failures indicate whether the vehicle can be driven by the processor in the autonomous mode; combining the set of probabilistic estimations into an overall probability of failure along the given proposed route; and determining the corresponding control information for the given proposed route based on the overall probability of failure. In this example, determining the corresponding control information for each route of the set of proposed routes based on the overall probability of failure includes: comparing the overall probability of failure to a threshold value; associating portions of that route where the overall probability of failure is above the threshold value with the autonomous mode; and associating portions of that route where the overall probability of failure is above the threshold value with the manual mode.

In another example, the method also includes, for each route of the set of proposed routes, determining a corresponding activity suggestion based on the corresponding control information for that route, and each provided routing option of the set of routing options further includes the corresponding activity suggestion for the proposed route of the given provided routing option. In another example, the method also includes, for each route of the set of proposed routes, determining a corresponding longest portion of autonomous mode based on the corresponding control information for the given proposed route, and each provided routing option further includes the corresponding longest portion of autonomous mode. In another example, the method also includes, for a particular route of the set of proposed routes, determining a corresponding activity which will be unavailable during the particular proposed route, and providing a notification with the set of routing options, indicating the corresponding activity which will be unavailable during the particular proposed route. In another example, the method also includes displaying a map including each proposed route of the set of routing options, and each proposed route of the map includes information indicating which portions of the route are associated with the manual mode and each proposed route of the map includes information indicating which portions of the route are associated with the autonomous mode.

Another aspect of the disclosure provides a system. The system includes memory storing detailed map information and a processor. The processor is configured to: receive input including a destination; generate a set of proposed routes between a current location of a vehicle and the destination based on the detailed map information; for each route of the set of proposed routes, generate corresponding control information, the control information defining which portions of a particular route may be maneuvered in a manual driving mode where a driver controls one or more of the steering, acceleration, and braking, and where the control information also defines which portions of the particular route may be maneuvered in an autonomous mode where the processor controls the steering, braking, and acceleration; provide a set of routing options, wherein each routing option includes a particular proposed route of the set of proposed routes and the corresponding control information for the proposed route; receive input indicating one of the proposed routes of the set of proposed routes; and after receiving the input indicating the one proposed route, maneuver the vehicle according to the corresponding control information for the indicated proposed routes.

In one example, the processor is configured to generate the corresponding control information for each route of the set of proposed routes by: inputting control factors into a probabilistic estimation of failure for a plurality of different types of failures along the given route to generate a set of probabilistic estimations, wherein the different types of failures indicate whether the vehicle can be driven by the processor in the autonomous mode; combining the set of probabilistic estimations into an overall probability of failure along the given proposed route; and determining the corresponding control information for the given proposed route based on the overall probability of failure. In this example, the processor is configured to determine the corresponding control information for each route of the set of proposed routes based on the overall probability of failure by: comparing the overall probability of failure to a threshold value; associating portions of that route where the overall probability of failure is above the threshold value with the autonomous mode; and associating portions of that route where the overall probability of failure is above the threshold value with the manual mode.

In another example, the processor is also configured to for each route of the set of proposed routes, determine a corresponding activity suggestion based on the corresponding control information for that route, and each provided routing option of the set of routing options further includes the corresponding activity suggestion for the proposed route of the given provided routing option. In another example, the processor is also configured to, for each route of the set of proposed routes, determine a corresponding longest portion of autonomous mode based on the corresponding control information for the given proposed route, and each provided routing option further includes the corresponding longest portion of autonomous mode. In another example, the processor is also configured to, for a particular route of the set of proposed routes, determine a corresponding activity which will be unavailable during the particular proposed route, and provide a notification with the set of routing options, indicating the corresponding activity which will be unavailable during the particular proposed route. In another example, the processor is also configured to display a map including each proposed route of the set of routing options, and where each proposed route of the map includes information indicating which portions of the route are associated with the manual mode and each proposed route of the map includes information indicating which portions of the route are associated with the autonomous mode.

A further aspect of the disclosure provides a non-transitory, tangible computer-readable storage medium on which computer readable instructions of a program are stored. The instructions, when executed by a processor, cause the processor to perform a method. The method includes receiving input including a destination; generating a set of proposed routes between a current location of a vehicle and the destination based on detailed map information; for each route of the set of proposed routes, generating corresponding control information, the control information defining which portions of a particular route may be maneuvered in a manual driving mode where a driver controls one or more of the steering, acceleration, and braking, and where the control information also defines which portions of the particular route may be maneuvered in an autonomous mode where the processor controls the steering, braking, and acceleration; providing a set of routing options, wherein each routing option includes a particular proposed route of the set of proposed routes and the corresponding control information for the proposed route; receiving input indicating one of the proposed routes of the set of proposed routes; and after receiving the input indicating the one proposed route, maneuvering the vehicle according to the corresponding control information for the indicated proposed routes.

In one example, generating the corresponding control information for each route of the set of proposed routes includes: inputting control factors into a probabilistic estimation of failure for a plurality of different types of failures along the given route to generate a set of probabilistic estimations, wherein the different types of failures indicate whether the vehicle can be driven by the processor in the autonomous mode; combining the set of probabilistic estimations into an overall probability of failure along the given proposed route; and determining the corresponding control information for the given proposed route based on the overall probability of failure. In this example, determining the corresponding control information for each route of the set of proposed routes based on the overall probability of failure includes: comparing the overall probability of failure to a threshold value; associating portions of that route where the overall probability of failure is above the threshold value with the manual mode; and associating portions of that route where the overall probability of failure is above the threshold value with the manual mode.

In another example, the method also includes, for each route of the set of proposed routes, determining a corresponding activity suggestion based on the corresponding control information for that route, and each provided routing option of the set of routing options further includes the corresponding activity suggestion for the proposed route of the given provided routing option. In another example, the method also includes, for each route of the set of proposed routes, determining a corresponding longest portion of autonomous mode based on the corresponding control information for the given proposed route, and each provided routing option further includes the corresponding longest portion of autonomous mode. In another example, the method also includes, for a particular route of the set of proposed routes, determining a corresponding activity which will be unavailable during the particular proposed route, and providing a notification with the set of routing options, indicating the corresponding activity which will be unavailable during the particular proposed route. In another example, the method also includes displaying a map including each proposed route of the set of routing options, and each proposed route of the map includes information indicating which portions of the route are associated with the manual mode and each proposed route of the map includes information indicating which portions of the route are associated with the autonomous mode.

DETAILED DESCRIPTION

In one aspect of the disclosure, a computer associated with a vehicle may receive user information including a destination. The computer may generate a set of proposed routes between the vehicle's current location and the destination. For each proposed route, the computer may generate corresponding control information. The control information includes which portions of a particular route may be maneuvered in a manual mode (where the driver generally has control of the vehicle) or an autonomous mode (where the computer maneuvers the vehicle without continuous input form the driver). In some examples, the control information may also include whether a semiautonomous mode (where the computer controls some aspects of the vehicle while the driver controls others) is applicable.

For each route of the set of proposed routes, generating the corresponding control information may include further steps. For example, control factors may be input into a set of probabilistic estimations for a plurality of different types of failures along a particular route. These failures refer to times when the vehicle is unable (for safety or other reasons) to maneuver in the autonomous mode. The set of probabilistic estimations for the different failure types may then be combined into an overall probability of failure along the particular route. The overall probability of failure may be compared to a threshold value of acceptable risk to determine corresponding control information for the particular route. These steps may be repeated sequentially or simultaneously for each proposed route of the set of proposed routes.

Once the control information is generated, the computer may also generate a corresponding activity suggestion for each proposed route based on the corresponding control information for that proposed route. The set of proposed routes, the corresponding control information, and the corresponding activity suggestion may be provided to the driver as a set of routing options. The computer may then user input indicating one of the routing options of the set of routing options. In response, the computer maneuvers the vehicle according to the proposed route and corresponding control information for the indicated one of the routing options.

Figure 1:
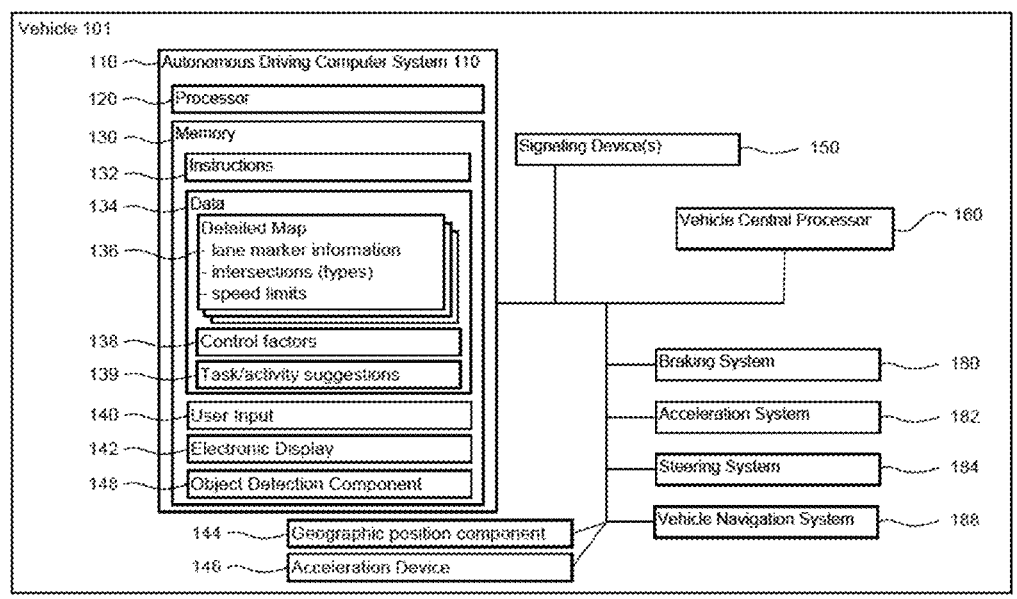
FIG. 1 is a functional diagram of a system in accordance with aspects of the disclosure.

As shown in FIG. 1, an autonomous driving system 100 in accordance with one aspect of the disclosure includes a vehicle 101 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, remote servers accessed via the internet, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated device such as an ASIC. Although FIG. 1 functionally illustrates the processor, memory, and other elements of computer 110 as being within the same block, it will be understood that the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein some of the components, such as steering components and deceleration components, may each have their own processor that only performs calculations related to the component's specific function.

In various aspects described herein, the processor may be located remotely from the vehicle and communicate with the vehicle wirelessly. In other aspects, some of the processes described herein are executed on a processor disposed within the vehicle while others are executed by a remote processor, including taking the steps necessary to execute a single maneuver.

Computer 110 may include all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input 140 (e.g., a mouse, keyboard, touch screen and/or microphone), as well as various sensors (e.g., a video camera) for gathering the explicit (e.g., a gesture) or implicit (e.g., "the person is asleep") information about the states and desires of a person.

Figure 2:
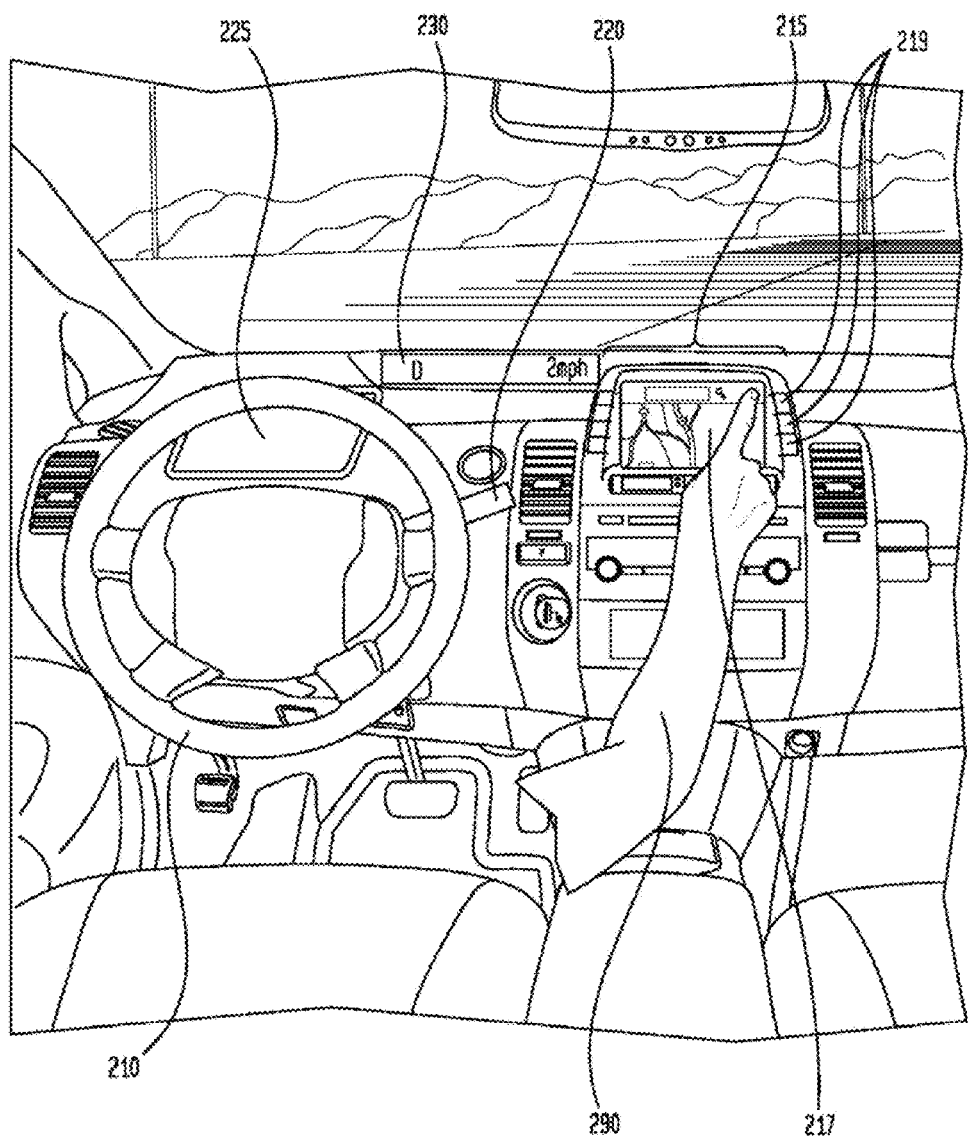
FIG. 2 is an interior of an autonomous vehicle in accordance with aspects of the disclosure.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220. The vehicle may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 110.

Vehicle 101 may also include one or more additional displays. For example, the vehicle may include a display 225 for displaying information regarding the status of the autonomous vehicle or its computer. In another example, the vehicle may include a status indicating apparatus such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, such as steering wheel 210, or provide various other types of indications.

The autonomous driving computing system may capable of communicating with various components of the vehicle. For example, returning to FIG. 1, computer 110 may be in communication with the vehicle's conventional central processor 160 and may send and receive information from the various systems of vehicle 101, for example the braking 180, acceleration 182, steering 184, and navigation 186 systems in order to control the movement, speed, etc., of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars, geographic landmarks, or road markings immediately around it which can often be determined with less noise that absolute geographical location.

The vehicle may also include other features in communication with computer 110, such as an accelerometer, gyroscope or another direction/speed detection device 146 to determine the direction and speed of the vehicle or changes thereto. By way of example only, device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

Figure 3A:
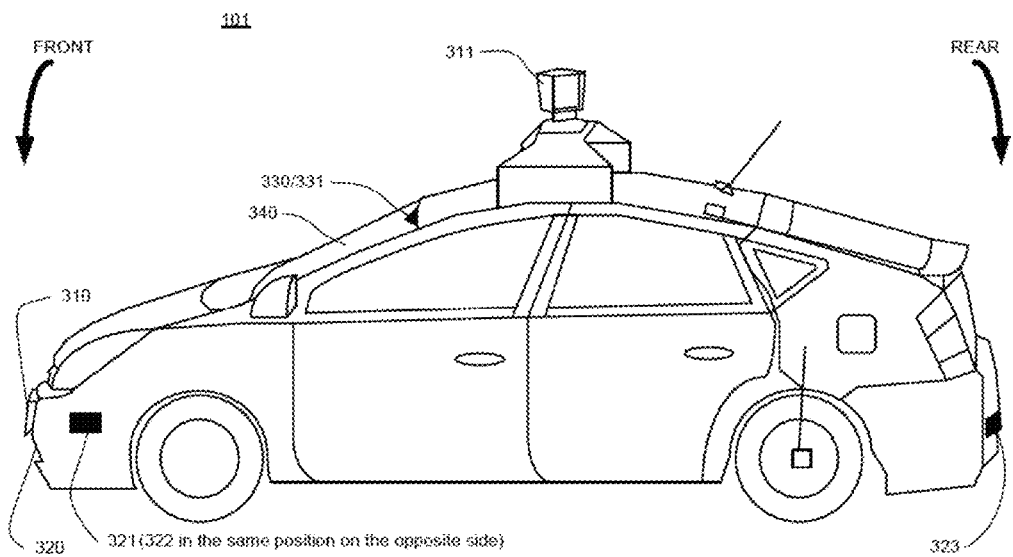
FIG. 3A is an exterior of an autonomous vehicle in accordance with aspects of the disclosure.

The vehicle may also include components 148 for detecting objects and conditions external to the vehicle such as other vehicles, obstacles in the roadway, traffic signals, signs, trees, etc. The detection system may include lasers, sonar, radar detection units (such as those used for adaptive cruise control), cameras, or any other detection devices which record data which may be processed by computer 110. For example, if the vehicle is a small passenger vehicle, the car may include a laser mounted on the roof or other convenient location. In one example, shown in FIG. 3A, vehicle 101 may comprise a small passenger vehicle. In this example, vehicle 300 may include 2 cameras 320-321 mounted under a windshield 330 near the rear view mirror (not shown) as well as radar detection units 320-323 located on the side (only one side being shown), front and rear of the vehicle. Vehicle 101 sensors may also include lasers 310 and 311, mounted on the front and top of the vehicle, respectively. The lasers may include commercially available lasers such as the Velodyne HDL-64 or other models. The lasers may provide the vehicle with range and intensity information which the computer may use to identify the location, distance, and reflectivity of various objects in the vehicles environment. In one aspect, the laser may measure the distance between the vehicle and the object surfaces facing the vehicle by spinning on its axis and changing its pitch.

The aforementioned sensors may allow the vehicle to understand and potentially respond to its environment in order to maximize safety for passengers as well as objects or people in the environment. It will be understood that the vehicle types, number and type of sensors, the sensor locations, the sensor fields of view, and the sensors' sensor fields are merely exemplary. Various other configurations may also be utilized.

In addition to the sensors described above, the computer may also use input from sensors typical non-autonomous vehicles. For example, these sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), precipitation sensors for automatic windshield wipers, etc.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

Figure 3B:
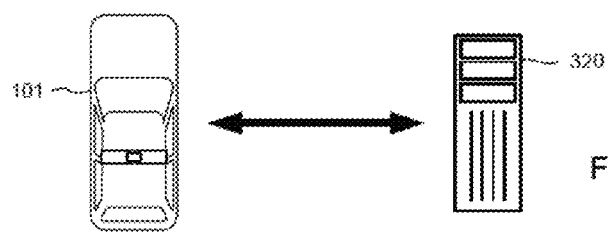
FIG. 3B is a pictorial diagram of a system in accordance with aspects of the disclosure.
Figure 3C:
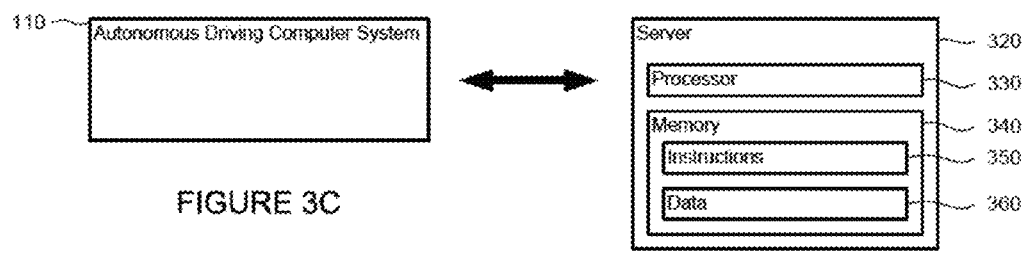
FIG. 3C is a functional diagram of a system in accordance with aspects of the disclosure.

Computer 110 may also receive or transfer information to and from other computers. For example, the map information stored by computer 110 may be received or transferred from other computers and/or the sensor data collected from the sensors of vehicle 101 may be transferred to another computer for processing as described herein. As shown in FIGS. 3B and 3C, data from computer 110 may be transmitted via a network to computer 320 for further processing. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces. In another example, data may be transferred by storing it on memory which may be accessed by or connected to computers 110 and 320.

In one example, computer 320 may comprise a server having a plurality of computers, e.g., a load balanced server farm, that exchange information with different nodes of a network for the purpose of receiving, processing and transmitting the data from computer 110. The server may be configured similarly to the computer 110, with a processor 330, memory 350, instructions 360, and data 370.

In addition to processing data provided by the various sensors and other computers, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, intersections, crosswalks, speed limits, traffic signals, buildings, signs, real time traffic information, or other such objects and information.

In some examples, the detailed map information may include predetermined virtual rails along which computer 110 may maneuver vehicle 101. These rails may therefore be associated with direction information indicative of the direction of a lane (or direction traffic should move in that lane) in which the rail appears. By following the rails, vehicle 101's future locations along a route may be predicted with a high degree of accuracy.

Figure 4:
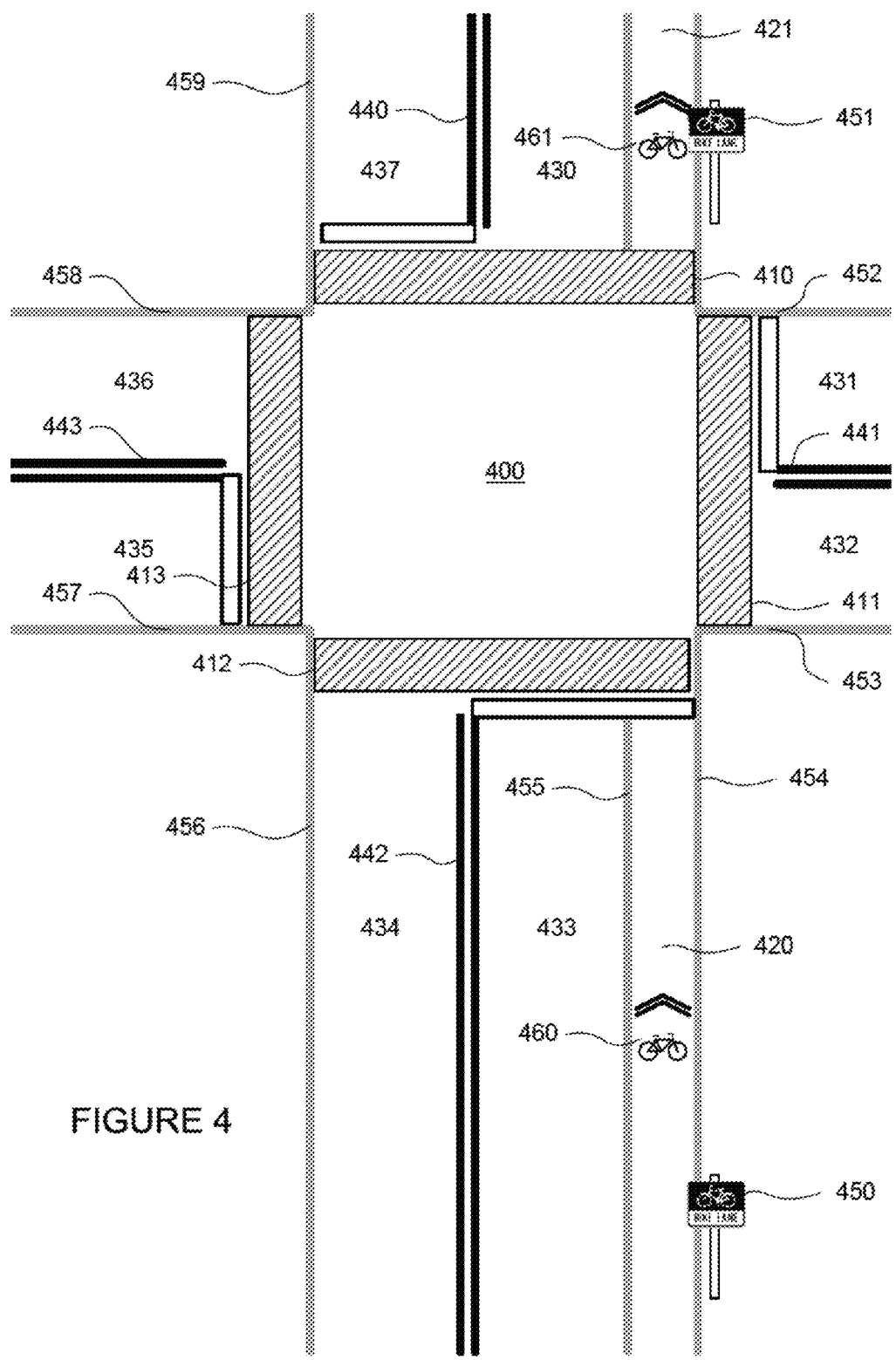
FIG. 4 is a diagram of an intersection and a portion of roadway in accordance with aspects of the disclosure.

FIG. 4 depicts a birds-eye view of an exemplary intersection 400. The intersection may include a number of different features such as crosswalks 410-13, bicycle lanes 420-21, lanes 430-37, lane lines 440-43, and roadway boundaries 450-459 (such as fog lines, curbs, etc.). Intersection 400 may also include indicators such as signs 450-51 and 460-61 identifying specific areas such as bicycle lanes 420-21. Other features such as traffic signals or stop signs may also be present, but are not shown.

Although intersection 400 includes four roadways meeting perpendicular to one another, various other intersection configurations, may also be employed. It will be further understood that aspects described herein are not limited to intersections, but may be utilized in conjunction with various other traffic or roadway designs which may or may not include additional features or all of the features described with respect to intersection 400.

Figure 5:
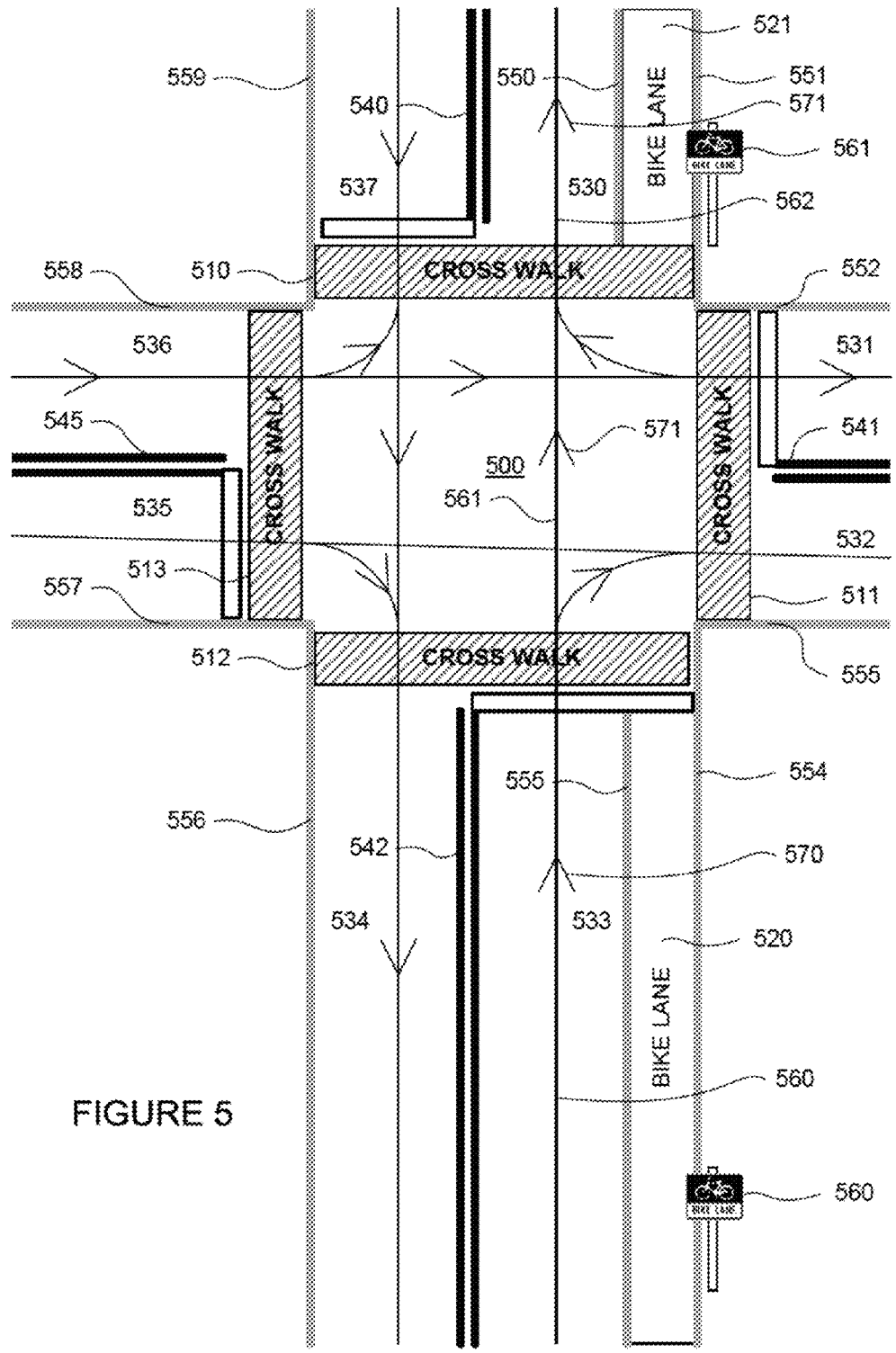
FIG. 5 is an example of detailed map information for the intersection and portion of roadway of FIG. 4 in accordance with aspects of the disclosure.

Data about the intersection (or other portions of the roadway) may be collected, for example, by driving a vehicle equipped various object detection components. The data may be processed in order to generate roadgraph information describing the roadway. For example, as shown in FIG. 5, based on laser, geographic location, and other information collected while driving a vehicle through intersection 400, a roadgraph 500 of the intersection may be generated. Similar to intersection 400, roadgraph 500 may include various features such as lanes 530-37, lane lines 540-43, and roadway boundaries 550-59 (such as fog lines, curbs, etc.). Each of these features may be associated with geographic location information identifying where these objects may be located in the real world (for example in intersection 400). Again, although roadgraph 500 is depicted as an image-based map, it will be understood that this information may be stored as a graph network or grid of data or other information describing the various features and their relationships.

Again, although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Returning to FIG. 1, data 134 of computer 110 may store various control factor data 138. The control factors may include the availability of detailed map information (e.g. a road map vs. a highly detailed map of the location of lane lines, curbs, etc.) along the route, input from current data feeds (including, for example, traffic, construction, accident information, and weather data), data from other autonomous vehicles reporting problem areas, and historical data (including past traffic data, dangerous areas or areas of high accident rates, weather conditions such as fog, bright sunlight, etc.).

Data 134 may also store task and activity suggestions 139. This may include, for example, a database or table may associate various lengths of time with corresponding tasks or activities. For example, time periods between 5 and 10 minutes may be associated with relatively short tasks such as text messaging or reading emails. Slightly longer periods may be associated with more involved tasks such as writing emails, web surfing, video games, etc. Even longer periods may be associated with activities such as watching a television show or movie. In some examples, where a driver identifies him or herself to computer 110 and specifically requests that computer 110 record and store such information, the task and activity suggestions data may also store information regarding which tasks a particular driver has typically engaged in during similar periods of time.

In addition to the operations described above and illustrated in the figures, various operations will now be described. It should be understood that the following operations do not have to be performed in the precise order described below. Rather, various steps can be handled in a different order or simultaneously, and steps may also be added or omitted.

A driver of an autonomous vehicle may begin a trip by indicating a destination. In this regard, a driver may initially input a destination, such as location coordinates (latitude and longitude), an address, an intersection, a point of interest, etc. using user input 140.

In response to receiving the destination, the vehicle's computer may generate a set of proposed routes between the vehicle's current location and the destination based on the detailed map 136. Each route may be based on typical navigational considerations such as the total travel time, travel distance, fuel economy, etc.

Each route of the set of proposed routs may also be associated with control information generated by computer 110. For example, the control information may include whether and which portions of the proposed route may be controlled by the vehicle alone (fully autonomous mode), by both the vehicle and the driver (semiautonomous mode), or the driver alone (manual mode). For example, when vehicle 101 is operating in an autonomous mode, features such as the braking system 180, acceleration system 182, signaling system 184, and navigation system 186 are being controlled by computer without continuous input from a driver. In a semiautonomous mode, the driver may have primary control over some control features while computer 110 has control over other features. In this example, the driver may control the steering by adjusting the steering wheel while computer 110 may control the braking and acceleration systems. In yet another type of semiautonomous mode, the computer may have primary control over all features, but the driver may be required to monitor the operation of the vehicle. For example, the driver may be required to confirm various information such as the state (red, yellow, green, etc.) of a traffic signal, whether a blind spot adjacent to the vehicle is clear, the posted speed limit, the number of lanes, etc. When the driver is controlling the vehicle in the manual mode, computer 110 or another of the vehicle's processing systems may control the vehicle based on input received from the driver at the steering wheel, brake pedal, and/or acceleration pedal.

The control information for the proposed routes may be based on one or more of the control factors of control factor data 138. These factors may be used to estimate the likelihood of different types of failures would be expected by computer 110.

A failure need not refer to a problem with computer 110 or the vehicle, but rather when computer 110 would identify an unsafe or dangerous driving condition. Such conditions may include situations in which a driver may not feel comfortable without full control of the vehicle or where computer 110 would not be able to safely maneuver the vehicle. Examples of unsafe or dangerous driving conditions may include areas lacking specific map information, areas where lots of pedestrians would be expected (such as around a mall), weather conditions that may affect the vehicle's sensor or the computer's control capabilities (such as precipitation, snow or ice covered roadways, bright sunlight etc.), high traffic areas, areas associated with high occurrences of accidents, or any such conditions which may be estimated or determined from the factors listed above.

One or more of the control factors of control factor data 138 may be input into a probabilistic estimation of how confident the computer is that a particular type of failure would not occur over a certain portion of the route. In one example, the computer 110 may use a machine learning classifier to compare correlated data such as past history of this or other vehicles and the number of times where there was a failure. The classifier may be trained across a number of different factors such as traffic feeds, weather, speeds of other autonomous vehicles, live or historic data from other autonomous vehicles, etc. The result may be a confidence value indicative of how likely the driver is going to be asked to take control.

In another example, computer 110 may use a heuristic approach. In this example, when a set of factors are known to cause any type of failure these factors may be considered together. In one example, if the type of failure is related to traffic congestion, the factors considered may include speed, number of vehicles, distance between vehicles, weather conditions, or any other factors known to affect traffic conditions. Each factor may be associated with some cost value. The costs of different factors may accumulate until a threshold is met, and the computer determines that a failure is likely. In yet another example, the computer 110 may examine historic data from this or other vehicles to determine the probability of failure at the same times and locations along a route.

Figure 6:
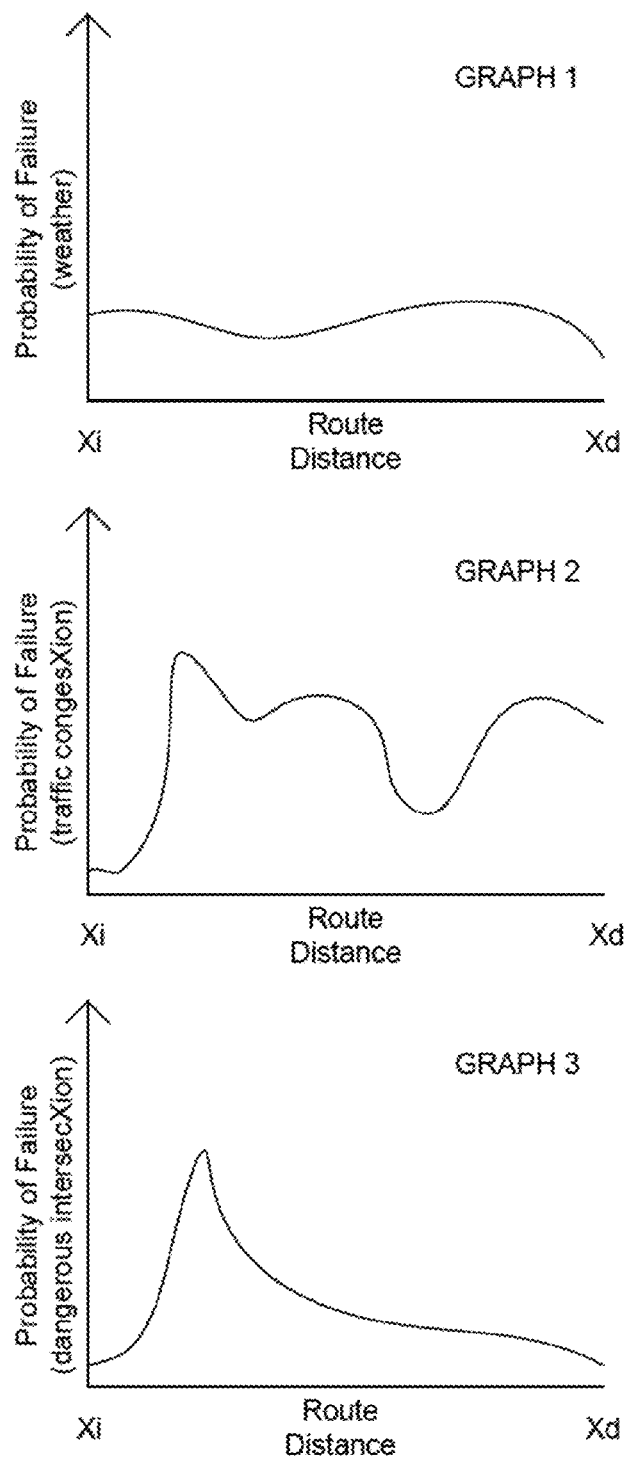
FIG. 6 is an example of graph data in accordance with aspects of the disclosure.

FIG. 6 is an example of 3 different probabilistic estimations for a route. In this example, each of the graphs 1-3 is plotted for the distance traveled along the route between an initial starting location Xi for the route and a destination location Xd. Similar plots may also be generated for the time of the route (as opposed to distance traveled). Each of the three graphs includes a probabilistic estimation for a particular type of failure. For example, graph 1 is plotted for a failure associated with weather predictions, graph 2 is plotted for a failure associated with traffic congestion, and graph 3 is plotted for a failure associated with dangerous intersections.

Figure 7:
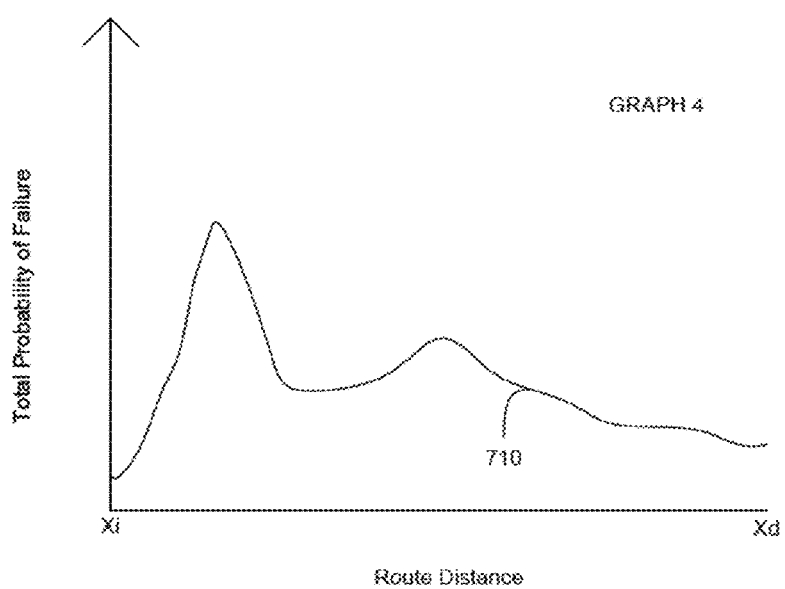
FIG. 7 is another example of graph data in accordance with aspects of the disclosure.

Each probabilistic estimation for the different types of failures may be considered together to determine an overall probability of failure along each part of the route. For example, if one of the probabilistic estimations indicates a possible failure, the computer 110 may determine from a single probabilistic estimation that a particular location along a route would surpass an acceptable level or threshold of risk. In this regard, the computer to determine that there would be a failure at some point along the route. In another example, the different probabilistic estimations may be added together, such as by using a weighted sum, to determine if some threshold of acceptable risk has been met. Thus, the factors may be used by computer 110 to determine the best driving mode for various portions of the route. For example, FIG. 7 is an example of a graph 4 plotted for a total probability of failure 710 along a route between the initial starting location Xi for the route and the destination location Xd.

The overall probability of failure may then be compared to one or more acceptable threshold values. For example, any portion of the route where the overall probability of failure is estimated to be at or below an acceptable threshold for autonomous driving may be determined to be appropriate for the autonomous mode. In one example, portions of the route where the overall probability of failure is below the acceptable threshold may be associated with the autonomous mode while portions of the route where the overall probability of failure is above the acceptable threshold may be associated with the manual mode.

Figure 8:
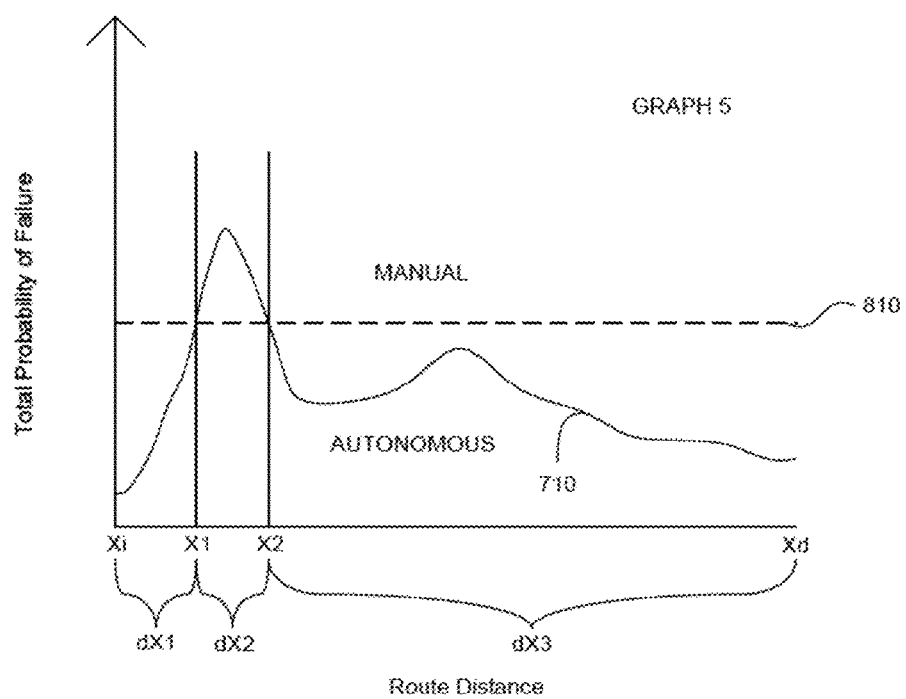
FIG. 8 is a further example of graph data in accordance with aspects of the disclosure.

For example, graph 5 of FIG. 8 depicts the overall probability of failure 710 as compared to an acceptable threshold 810. In this example, the overall probability of failure crosses threshold 810 at two locations, X1 and X2, along the route between Xi and Xd. Thus, the probability of failure 710 is below threshold 810 between Xi and location X1 (along dX1) as well as between X2 and Xd (along dX3). The probability of failure 710 is above threshold 810 between X1 and X2 (along dX3). In this example, portions above threshold 810 may be associated with the manual mode while portions below the threshold may be associated with the autonomous mode. In this regard, dX1 and dX3 may be associated with the autonomous mode as the overall probability of failure 710 is below the threshold 810, while dX2 may be associated with the manual mode as the overall probability of failure 710 is above threshold 810.

Areas of a route which may be above an acceptable threshold and associated with the manual mode may include, for example, those where only a street map is available. In another example, a particular portion along a route which is projected to have a high volume of traffic during the time which the vehicle would travel may be associated probability of failure that is above the acceptable threshold for autonomous driving, requiring a manual mode. In yet another example, if detailed map 136 is available for a given portion of the area, and no other circumstances which alone or cumulatively would increase the probability of failure above the acceptable threshold exist, the given portion may be associated with the autonomous mode.

In another example, computer 110 may also be capable of operating in the semiautonomous mode. In this example, the overall probability of failure may be compared to two different thresholds, for example, one for autonomous driving and another for semiautonomous driving. Any portion of the route associated with an overall probability of failure is above the acceptable threshold for autonomous driving, but below an acceptable threshold for semiautonomous driving may be determined to be portion of the route appropriate for the semiautonomous mode.

Figure 9:
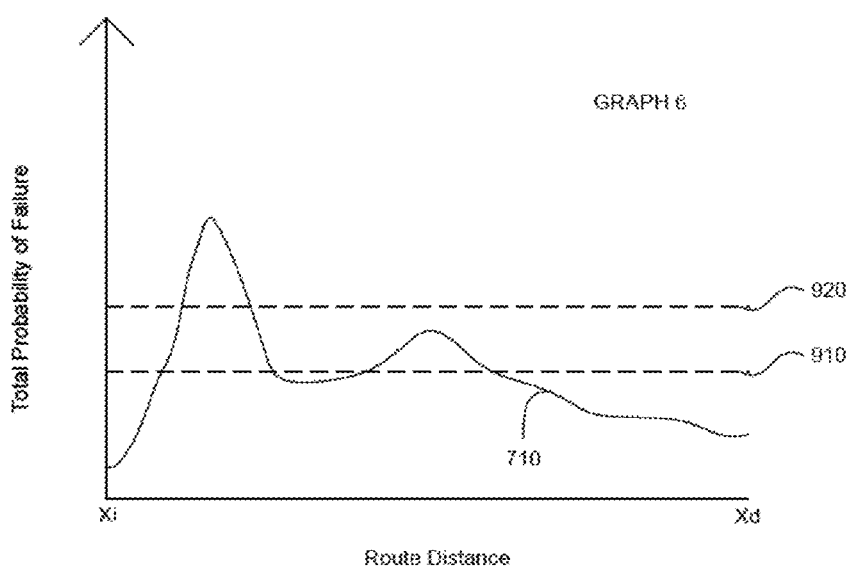
FIG. 9 is yet another example of graph data in accordance with aspects of the disclosure.

For example, graph 6 of FIG. 9 depicts the total probability of failure 710 with an acceptable autonomous threshold 910 and an acceptable semiautonomous threshold 920. Similar to the example of FIG. 9, portions of the route where the overall probability of failure 710 is below the autonomous threshold 910 may be associated with the autonomous mode, portions of the route where the overall probability of failure 710 is above the autonomous threshold 910 but below the semiautonomous threshold 920 may be associated with the semiautonomous mode, and portions of the route where the overall probability of failure 710 is above the semiautonomous threshold 920 may be associated with the manual mode.

An example of circumstances which would between thresholds 910 and 920 may include when a street map as well as speed limit information is available for a given portion, the given portion may be associated with either the manual mode or a semiautonomous mode (as described above. For example, the semiautonomous mode may be appropriate where the probability of failure is close to, but has not actually surpassed the acceptable level of risk. In this regard, the driver may have a greater level of concentration on the road such that he or she is able to take over at a moment's notice. Thus, the vehicle can safely drive in the semiautonomous mode with sufficient time to provide any necessary warning to the driver of the need to take immediate control. For example, some failures may have longer lead times than others (exiting or entering freeways may have more lead time than traffic congestion). Accordingly, when recommending the autonomous mode for some portion of the route, the computer may consider the type of failure and the amount of time associated with those types of failures.

Thus, the probabilistic estimations determined based on the various control factors of factor data 138, the overall probability of failure, and the one or more thresholds may be used by computer 110 to generate the control information for each proposed route.

Figure 10:
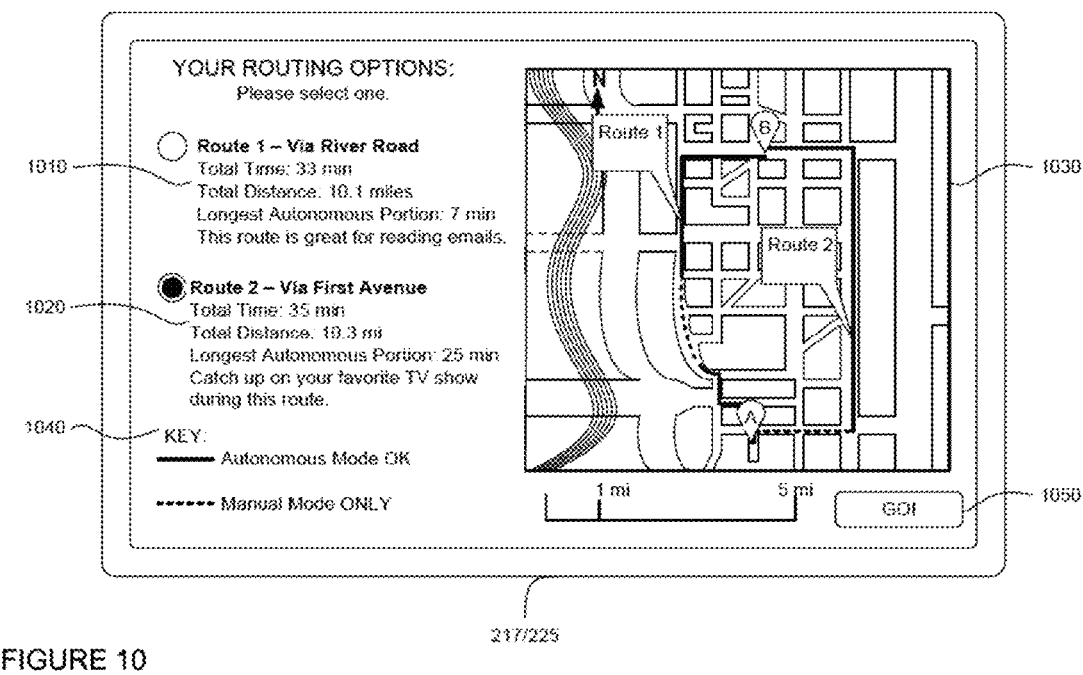
FIG. 10 is an example display device and screen shot in accordance with aspects of the disclosure.

The computer may then provide the proposed routes and control information as routing options to the driver. For example, a given proposed route may be displayed to a user with information such as a total time for the route and a map depicting the given proposed route as with typical navigational systems. The computer may also provide details such as the time of the longest stretch of driving associated with the autonomous mode as well as map information highlighting the location of the route including information indicating which portions of the routes are associated with the type of control. In another example, computer 110 may provide information regarding not only the total time of the route but also the total time in the various driving modes. FIG. 10 is one example of how computer 110 may provide the proposed routing options to the driver, though various other methods may also be used. FIG. 10 may thus include an example screen shot of touch screen 217 and/or display 225. In this example, computer 110 displays a set of routing options 1010, 1020 to the driver. Routing option 1010 includes Route 1 between initial and destination locations A and B depicted on map 1030 via River Road, while routing option 1020 includes Route 2 between initial and destination locations A and B via First Avenue. The routing options in this example include a total estimated travel time for each route as well as a time for the longest autonomous portion of each route.

As noted above, computer 110 may also provide the control information determined for the routing options to the driver. For example, computer 110 may designate the portions of the route associated with different modes of driving (as determined from the probability of failure and thresholds described above). In the example of FIG. 10, key 1040 distinguishes between the different operating modes based on the type of line displayed on map 1030, this information may be displayed in other ways, such as by different colors, line widths, etc. Thus, in this example, Route 1 begins at location A in the autonomous mode, switches to a manual mode, and then concludes in an autonomous mode at location B. Route 2 begins at location A in the manual mode and subsequently switches to an autonomous mode until reaching location B. In this example, once the driver has decided upon a routing option, the driver may select that option and select button 1050 to begin the selected routing option in the predetermined driving mode.

In some examples, computer 110 may also provide the driver with task and activity suggestions for each of the routes. As noted above, the task and activity suggestion data 139 may associate specific suggestions with different periods of time. Computer may search this data and identify a suggestion based on how long the driver may have to perform different tasks or activities during a particular proposed route. Thus, suggestions may be selected based on an estimated period of time for a portion of the route where vehicle 101 may operate in the autonomous mode, or rather, the amount of time computer 110 determines that it may control vehicle 101 without input from the driver.

In one example, if a portion of a route may be completed in the autonomous mode, the vehicle's computer may provide suggestions for the driver to occupy that time. If a portion would provide a longer period of the autonomous mode, the computer may recommend longer activities such as watching a television show or movie. Similarly, shorter tasks such as checking text messages or games may be suggested for shorter periods of time associated with the autonomous mode. For example, routing options 1010 and 1020 each include a recommendation for the driver. Routing option 1 suggests reading emails as the longest stretch of autonomous mode is only 7 minutes. Routing option 2 suggests a more time consuming activity of watching a television show as the longest stretch of autonomous mode is 25 minutes. In another example, route 2 might be associated with a suggestion that the driver could finish a movie started previously, while route 1 may be associated with a suggestion that the driver could complete only one or 2 levels of a popular game.

The example suggestions provided in FIG. 10 are based on the longest period of time of the routes associated with the autonomous mode. However, the suggestions may also be based on the amount (time or distance) of any portion of a route associated with the autonomous mode. In another example, the suggestions may be based on the driver's previous reaction times. For example, it may be important in certain areas associated with higher probabilities of failure, which have not quite met the threshold for acceptable risk, that the driver be prepared to take control of the vehicle quickly. Thus, the computer 110 may suggest activities which the driver is easily and quickly taken away from for such areas along the route. In this regard, it may be easier to draw the driver from texting than from reading a book, etc.

In some examples, the recommended activities may be based on past actions by the driver (e.g. he or she prefers games or emailing). This may assist the user in selecting which route option to chose. These recommendations may also be provided while the vehicle is being driven (either by the computer, the user, or both) to the destination.

In addition or as an alternative to providing suggestions, the computer may warn or enforce which activities a user may perform during the drive. For example, the computer may note with the routing options that a certain routing option does not have a large enough portion or cumulative total time associated with the autonomous mode to perform some task show so that a particular task or activity may be disabled during the proposed route. Similarly, certain features may be disabled by the computer during portions which may require some oversight, semiautonomous driving, or control by the user. This information may be provided to the driver as a notification with the routing options.

The driver may then select one of the routing options. In response computer 110 may begin to navigate the route according to the control information. Referring to FIG. 10, if the driver selects routing option 1010, computer 110 may begin maneuvering vehicle 101 the autonomous mode along Route 1. In the driver selects routing option 1020 (as actually shown in the example of FIG. 10), computer 110 may indicate to the driver that he or she must begin driving in the manual mode along Route 2.

Figure 11:
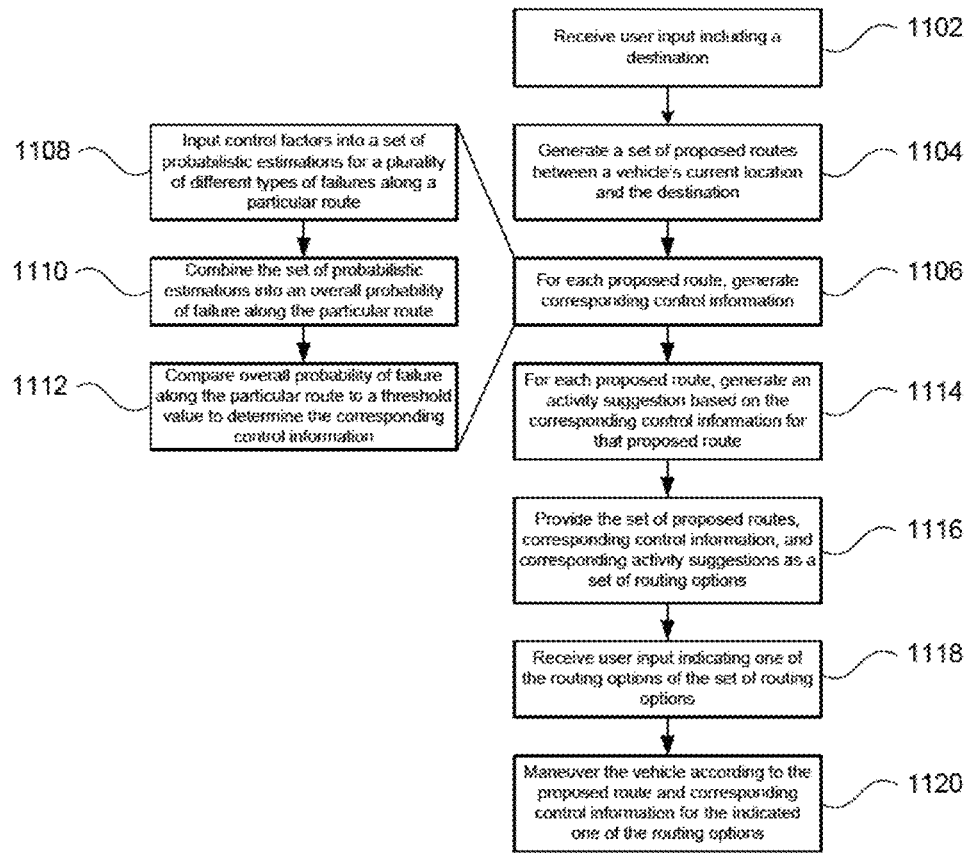
FIG. 11 is a flow diagram in accordance with aspects of the disclosure.

Flow diagram 1100 of FIG. 11 is an example of some of the features described above as performed by computer 110. In this example, the computer receives user information including a destination at block 1102. The computer then generates a set of proposed routes between a vehicle's current location and the destination at block 1104. For each proposed route, the computer generates corresponding control information at block 1106. As noted above, the control information includes which portions of a particular route may be maneuvered in a manual mode or an autonomous mode. In some examples, this may also include a semiautonomous mode.

For each route of the set of proposed routes, generating the corresponding control information at block 1106 desirably includes the steps of blocks 1108 through 1112. For example, control factors are input into a set of probabilistic estimations for a plurality of different types of failures along a particular route at block 1108. Again, these failures refer to times when the vehicle is unable (for safety or other reasons) to maneuver in the autonomous mode. The set of probabilistic estimations are then combined into an overall probability of failure along the particular proposed route at block 1110. The overall probability of failure is compared to a threshold value to determine corresponding control information for the particular route at block 1112. These steps may be repeated sequentially or simultaneously for each proposed route of the set of proposed routes.

Once the control information is generated, the computer generates a corresponding activity suggestion for each proposed route based on the corresponding control information for that proposed route at block 1114. The set of proposed routes, the corresponding control information, and the corresponding activity suggestion as a set of routing options at block 1116. The computer receives user input indicating one of the routing options of the set of routing options at block 1118. In response, the computer maneuvers the vehicle according to the proposed route and corresponding control information for the indicated one of the routing options at block 1120.

Being able to predict how much of a route may require driver interaction (and therefore how much of the route can be autonomous) may be a useful feature in trip planning. For example, a user may prefer a route that maximizes the amount of autonomous driving (and minimizes manual driving mode) and thus, using the features described herein, a route may be selected accordingly.

As these and other variations and combinations of the features discussed above can be utilized without departing from the subject matter as defined by the claims, the foregoing description of exemplary implementations should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method comprising:
   receiving, by one or more processors, input including a destination;
   generating, by the one or more processors, a set of proposed routes between a current location of a vehicle and a destination based on detailed map information, the set of proposed routes including a first route and a second route different from the first route;
   for each particular route of the set of proposed routes, generating by the one or more processors, corresponding control information for controlling the vehicle along the particular route in a manual driving mode where a driver controls one or more of the steering, acceleration, and braking and in an autonomous mode where the processor controls the steering, braking, and acceleration, wherein the corresponding control information for the first route defines a first portion of the first route that will be maneuvered in the manual driving mode and a second portion of the first route that will be maneuvered in the autonomous mode, and the corresponding control information for the second route defines a first portion of the second route that will be maneuvered in the manual driving mode and a second portion of the second route that will be maneuvered in the autonomous mode, the first portion of the second route being different from the first portion of the first route;
   providing for display, by the one or more processors, a set of routing options wherein the set of at least two routing options includes the first route, the second route, the corresponding control information for the first route, and the corresponding control information for the second route;
   receiving, by the one or more processors, input indicating one of the routing options of the set of routing options that includes one of the first and second routes; and
   after receiving the input, maneuvering, by the one or more processors, the vehicle according to the corresponding control information for the indicated one of the routing options.

2. The method of claim 1, wherein generating the corresponding control information for each route of the set of proposed routes includes:
   inputting control factors into a probabilistic estimation of failure for a plurality of different types of failures along the given route to generate a set of probabilistic estimations, wherein the different types of failures indicate whether the vehicle can be driven by the processor in the autonomous mode;
   combining the set of probabilistic estimations into an overall probability of failure along the given proposed route; and
   determining the corresponding control information for the given proposed route based on the overall probability of failure.

3. The method of claim 2, wherein determining the corresponding control information for each route of the set of proposed routes based on the overall probability of failure includes:
   comparing the overall probability of failure to a threshold value;
   associating portions of that route where the overall probability of failure is above the threshold value with the autonomous mode; and associating portions of that route where the overall probability of failure is above the threshold value with the manual mode.

4. The method of claim 1, further comprising:
for each route of the set of proposed routes, determining a corresponding activity suggestion based on the corresponding control information for that route, and
wherein each provided routing option of the set of routing options further includes the corresponding activity suggestion for the proposed route of the given provided routing option.

5. The method of claim 1, further comprising:
for each route of the set of proposed routes, determining a corresponding longest portion of autonomous mode based on the corresponding control information for the given proposed route, and
wherein each provided routing option further includes the corresponding longest portion of autonomous mode.

6. The method of claim 1, further comprising:
for a particular route of the set of proposed routes, determining a corresponding activity which will be unavailable during the particular proposed route, and
providing a notification with the set of routing options, indicating the corresponding activity which will be unavailable during the particular proposed route.

7. The method of claim 1, further comprising displaying a map indicating the second portions of the first and second routes that will be driven in the manual mode and the seconds portions of the first and second routes that will be driven in the autonomous mode.

8. The method of claim 1, wherein the first route is longer in time than the second route, and the first portion of the first route is longer in time than the first portion of the second route.

9. The method of claim 1, wherein the first route is longer in time than the second route, and the first portion of the second route is longer in time than the first portion of the first route.

10. A system comprising:
memory storing detailed map information;
a processor configured to:
receive input including a destination;
generate a set of proposed routes between a current location of a vehicle and the destination based on the detailed map information, the set of proposed routes including a first route and a second route different from the first route;
for each route of the set of proposed routes, generate corresponding control information for controlling the vehicle along the particular route in a manual driving mode where a driver controls one or more of the steering, acceleration, and braking and in an autonomous mode where the processor controls the steering, braking, and acceleration, wherein the corresponding control information for the first route defines a first portion of the first route that will be driven in the manual driving mode and a second portion of the first route that will be driven in the autonomous mode, and the corresponding control information for the second route defines a first portion of the second route that will be driven in the manual driving mode and a second portion of the second route that will be driven in the autonomous mode, the first portion of the second route being different from the first portion of the first route;
provide for display a set of routing options wherein the set of at least two routing options includes the first route, the second route, the corresponding control information for the first route, and the corresponding control information for the second route;
receive input indicating one of the routing options of the set of routing options that includes one of the first and second routes; and
after receiving the input, maneuver the vehicle according to the corresponding control information for the indicated one of the routing options.

11. The system of claim 10, wherein the processor is configured to generate the corresponding control information for each route of the set of proposed routes by:
inputting control factors into a probabilistic estimation of failure for a plurality of different types of failures along the given route to generate a set of probabilistic estimations, wherein the different types of failures indicate whether the vehicle can be driven by the processor in the autonomous mode;
combining the set of probabilistic estimations into an overall probability of failure along the given proposed route; and
determining the corresponding control information for the given proposed route based on the overall probability of failure.

12. The system of claim 11, wherein the processor is configured to determine the corresponding control information for each route of the set of proposed routes based on the overall probability of failure by:
comparing the overall probability of failure to a threshold value;
associating portions of that route where the overall probability of failure is above the threshold value with the autonomous mode; and
associating portions of that route where the overall probability of failure is above the threshold value with the manual mode.

13. The system of claim 10, wherein the processor is further configured to:
for each route of the set of proposed routes, determine a corresponding activity suggestion based on the corresponding control information for that route, and
wherein each provided routing option of the set of routing options further includes the corresponding activity suggestion for the proposed route of the given provided routing option.

14. The system of claim 10, wherein the processor is further configured to:
for each route of the set of proposed routes, determine a corresponding longest portion of autonomous mode based on the corresponding control information for the given proposed route, and
wherein each provided routing option further includes the corresponding longest portion of autonomous mode.

15. The system of claim 10, wherein the processor is further configured to:
for a particular route of the set of proposed routes, determine a corresponding activity which will be unavailable during the particular proposed route, and
provide a notification with the set of routing options, indicating the corresponding activity which will be unavailable during the particular proposed route.

16. The system of claim 10, wherein the processor is further configured to display a map including each proposed route of the set of routing options, and where each proposed route of the map includes information indicating which portions of the route are associated with the manual mode and each proposed route of the map includes information indicating which portions of the route are associated with the autonomous mode.

17. A non-transitory, tangible computer-readable storage medium on which computer readable instructions of a program are stored, the instructions, when executed by a processor, cause the processor to perform a method, the method comprising:
    receiving input including a destination;
    generating a set of proposed routes between a current location of a vehicle and the destination based on detailed map information, the set of proposed routes including a first route and a second route different from the first route;
    for each route of the set of proposed routes, generating corresponding control information for controlling the vehicle along the particular route in a manual driving mode where a driver controls one or more of the steering, acceleration, and braking and in an autonomous mode where the processor controls the steering, braking, and acceleration, corresponding control information for the first route defines a first portion of the first route that will be driven in the manual driving mode and a second portion of the first route that will be driven in the autonomous mode, and the corresponding control information for the second route defines a first portion of the second route that will be driven in the manual driving mode and a second portion of the second route that will be driven in the autonomous mode, the first portion of the second route being different from the first portion of the first route;
    providing for display a set of routing options, wherein the set of routing options wherein the set of at least two routing options includes the first route, the second route, the corresponding control information for the first route, and the corresponding control information for the second route;
    receiving input indicating one of the routing options of the set of routing options that includes one of the first and second routes; and
    after receiving the input, maneuvering the vehicle according to the corresponding control information for the indicated one of the routing options.

18. The medium of claim 17, wherein generating the corresponding control information for each route of the set of proposed routes includes:
    inputting control factors into a probabilistic estimation of failure for a plurality of different types of failures along the given route to generate a set of probabilistic estimations, wherein the different types of failures indicate whether the vehicle can be driven by the processor in the autonomous mode;
    combining the set of probabilistic estimations into an overall probability of failure along the given proposed route; and
    determining the corresponding control information for the given proposed route based on the overall probability of failure.

19. The medium of claim 18, wherein determining the corresponding control information for each route of the set of proposed routes based on the overall probability of failure includes:
    comparing the overall probability of failure to a threshold value;
    associating portions of that route where the overall probability of failure is above the threshold value with the autonomous mode; and
    associating portions of that route where the overall probability of failure is above the threshold value with the manual mode.

20. The medium of claim 17, wherein the method further comprises:
    for each route of the set of proposed routes, determining a corresponding longest portion of autonomous mode based on the corresponding control information for the given proposed route, and
    wherein each provided routing option further includes the corresponding longest portion of autonomous mode.

21. The medium of claim 17, wherein the method further comprises displaying a map indicating the second portions of the first and second routes that will be maneuvered in the manual mode and the seconds portions of the first and second routes that will be driven in the autonomous mode.

22. A method comprising:
    identifying, by one or more processors, a first route between two locations and a second route between the two locations;
    for first and second portions of each of the first route and the second route determining, by the one or more processors, whether that portion can be driven in an autonomous mode where a computer controls the steering, braking, and acceleration for a vehicle based on a combination of:
        pre-stored information for that portion, and
        real-time data for that portion;
    generating a first routing option based on the first route where the first portion of the first route can be driven in the autonomous mode and the second portion of the second route cannot be driven in the autonomous mode;
    generating a second routing option based on the second route where the first portion of the second route can be driven in the autonomous mode and the second portion cannot be driven in the autonomous mode;
    providing for display the first routing option and the second routing options, including the first and second portions of the first and second routes, for display to a user;
    in response to the providing, receiving user input identifying the second routing option; and
    maneuvering the vehicle based on the second routing option.

23. The method of claim 22, further comprising:
    determining for the first routing option a first period of time for autonomous driving based on the first portion of the first route;
    determining for the second routing option a second period of time for autonomous driving for the first portion of the second route, wherein the second period is greater than the first period;
    before receiving the user input displaying, on a display, the first period of time and the second period of time.

24. The method of claim 23, further comprising:
    determining for the first routing option a third period of time for manual driving based on the first portion of the first route;
    determining for the second routing option a fourth period of time for manual driving for the first portion of the second route;
    before receiving the user input displaying, on a display, the second period of time and the fourth period of time.

25. The method of claim 22, further comprising accessing the pre-stored information for the first portion of the first route from memory and wherein the pre-stored information includes prior traffic data for the first portion of the first route.

26. The method of claim 22, further comprising accessing the pre-stored information for the first portion of the first route from memory and wherein the pre-stored information includes prior weather data for the first portion of the first route.

27. The method of claim 22, further comprising accessing the pre-stored information for the first portion of the first route from memory and wherein the pre-stored information includes prior accident data for the first portion of the first route.

28. The method of claim 22, further comprising receiving the real-time data for the first portion of the first route from a second vehicle.

29. The method of claim 22, further comprising receiving the real-time data for the first portion of the first route from a remote computer via a network and the real-time data includes weather information.

30. The method of claim 22, further comprising receiving the real-time data for the first portion of the first route from a remote computer via a network and the real-time data includes traffic congestion information.

31. The method of claim 22, further comprising displaying a map indicating the second portions of the first and second routes as being driven in the manual mode and the second portions of the first and second routes as being driven in the autonomous mode.

* * * * *